United States Patent
Kanou et al.

(10) Patent No.: US 7,421,181 B2
(45) Date of Patent: Sep. 2, 2008

(54) RETENTION RELEASE AUXILIARY DEVICE FOR OPTICAL CONNECTOR AND PRINTED CIRCUIT BOARD DEVICE

(75) Inventors: Kouji Kanou, Fukuoka (JP); Hiroyuki Shouyama, Fukuoka (JP); Masahiko Kondo, Fukuoka (JP); Yoshiyuki Nakayama, Fukuoka (JP); Kazunari Fukagawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/889,656

(22) Filed: Aug. 15, 2007

(65) Prior Publication Data

US 2008/0044136 A1 Feb. 21, 2008

(30) Foreign Application Priority Data

Aug. 16, 2006 (JP) .............................. 2006-222088

(51) Int. Cl.
*G02B 6/36* (2006.01)
*G02B 6/00* (2006.01)

(52) U.S. Cl. .................. 385/134; 385/139; 385/76; 385/53

(58) Field of Classification Search .................. 385/53, 385/76–94, 134, 139, 147
See application file for complete search history.

(56) References Cited

U.S. PATENT DOCUMENTS 6,017,153 A   1/2000  Carlisle et al.

6,511,231 B2*  1/2003  Lampert et al. ............... 385/70

FOREIGN PATENT DOCUMENTS

| JP | 63-184271 | 7/1988 |
|----|-----------|--------|
| JP | 63-184272 | 7/1988 |
| JP | 63-184273 | 7/1988 |
| JP | 11-64682 | 3/1999 |
| JP | 3390697 | 1/2003 |
| JP | 2005-17602 | 1/2005 |
| JP | 2006-11102 | 1/2006 |

* cited by examiner

*Primary Examiner*—Kevin S Wood
(74) *Attorney, Agent, or Firm*—Staas & Halsey LLP (57) ABSTRACT

A release auxiliary device (6) includes a base member (51) fixedly provided with respect to a receptacle (11), and an auxiliary lever (52) provided in an elastically deformable manner with respect to the base member (51). The auxiliary lever (52) has a base part (61) extending to the base member (51), a pressing part that extends to the base part and is touchable to an end portion of a lever (41), and an operating part (63) that extends to the pressing part and is disposed at a position closer to the body of the plug than the end portion of the lever is. By operating the operating part (63) with fingers, the pressing part (62) presses against the end portion of the lever (41) and moves the same, so that the engagement between engaging portions (42, 28) for retention can be released.

5 Claims, 11 Drawing Sheets

120; # RETENTION RELEASE AUXILIARY DEVICE FOR OPTICAL CONNECTOR AND PRINTED CIRCUIT BOARD DEVICE

BACKGROUND OF THE INVENTION

1. Field of the Invention

The present invention relates to a retention release auxiliary device for an optical connector including a plug to which optical fibers are coupled and a receptacle into which the plug is inserted.

2. Description of the Related Art

Along with expansion of information networks in recent years, optical fiber communication has become mainstream. Further, it is required to increase the number of optical lines and the density thereof.

A communication device is installed in each node of an optical communication system. A printed circuit board having a function of housing an optical line and controlling the same is mounted on a rack shelf of the communication device. An interface optical connector is mounted on the printed circuit board and optical fibers are detachably connected to the optical connector. Such optical connectors having various shapes are proposed or standardized (see Japanese unexamined patent publication Nos. 2005-17602 and 11-64682 and Japanese patent No. 3390697). For example, an LC type connector that can be decreased in size and increased in density is normally used in a communication carrier in North America.

Such an optical connector has a latch mechanism for retention. A plug to which optical fibers are connected is inserted into a receptacle and thereby the latch mechanism operates automatically, ensuring the coupling between the plug and the receptacle. When a lever provided in the plug is operated by fingers to release the latch mechanism, the plug can be detached from the receptacle.

Upon the detachment of the plug, in the case of an environment where a sufficient space is secured, it is easy to operate a small lever with fingers and release the latch mechanism. However, it is not easy in the case where an optical connector is mounted in a small space.

Specifically, usually, a plurality of the printed circuit boards described above are densely mounted on a shelf. In the case where, for example, a plurality of the printed circuit boards are made adjacent to one another and are installed in a slot, a receptacle of an optical connector is attached to a step-like front plate that is fastened to each of the printed circuit boards. In this case, it is necessary to house also an extension area of optical fibers connected to the optical connector in an area within the shelf. Accordingly, it necessarily follows that the mounting position of the optical connector is a position back from the shelf surface. Under this condition, it is difficult to put fingers in order to attach/detach the plug. In particular, it is hard to operate the lever with fingers to release the latch mechanism.

For this reason, upon the detachment of the plug, a tool is conventionally necessary to release the latch mechanism.

SUMMARY

The present disclosure is directed to solve the problems pointed out above, and therefore, an object of an embodiment of the present invention is to improve operability for retention release of an optical connector used for connection of optical fibers. Another object of an embodiment of the present invention is to facilitate attachment/detachment of a plug even in the case where an optical connector is provided in a small space.

A device according to one aspect of the present invention is a retention release auxiliary device for an optical connector, the optical connector including a plug to which optical fibers are coupled and a receptacle into which the plug is inserted. The plug is provided with a lever on a front side of a body of the plug, the lever being elastically deformable to approach the body of the plug by operating an end portion of the lever with fingers. An engaging portion formed in the lever engages with an engaging portion provided in the receptacle, leading to retention of the engaging portion of the lever and the engaging portion of the receptacle. The lever is caused to be deformed against an elastic force thereof by operating the end portion of the lever with fingers, so that the engagement between the engaging portions is released, enabling detachment of the plug from the receptacle. The retention release auxiliary device includes a base member that is fixedly provided with respect to the receptacle, and an auxiliary lever that is provided in an elastically deformable manner with respect to the base member. The auxiliary lever includes a base part extending to the base member, a pressing part that extends to the base part and is touchable to the end portion of the lever, and an operating part that extends to the pressing part and is disposed at a position closer to the body of the plug than the end portion of the lever is. The pressing part presses against the end portion of the lever, moves the lever by operating the operating part with fingers, enabling release of the engagement between the engaging portions.

Preferably, the operating part may be disposed on a side surface side of the body of the plug and may be operable with fingers on the side surface side of the body of the plug.

Further, the operating part may have a plane-like shape extending along an axis direction of the plug, and the operating part and the pressing part may be connected to each other via a plane and may form a substantially Z-shape as viewed from a lateral side.

Furthermore, the receptacle may be configured to receive at least two plugs side by side therein, and the base member may be provided with two of the auxiliary levers, and the operating parts of the two auxiliary levers may be disposed on side surface sides opposite to the bodies of the plugs respectively, enabling separate operation of the two plugs.

According to another aspect of the present invention, a printed circuit board device includes an optical connector that is mounted on a front side of a printed circuit boar, and the retention release auxiliary device for an optical connector described above that is attached to the optical connector.

The structure described above can improve operability for retention release of an optical connector used for connection of optical fibers. In addition, the structure described above can facilitate attachment/detachment of a plug even in the case where an optical connector is provided in a small space.

These and other characteristics and objects of the present invention will become more apparent by the following descriptions of preferred embodiments with reference to drawings.

DESCRIPTION OF THE PREFERRED EMBODIMENTS

Figure 1:
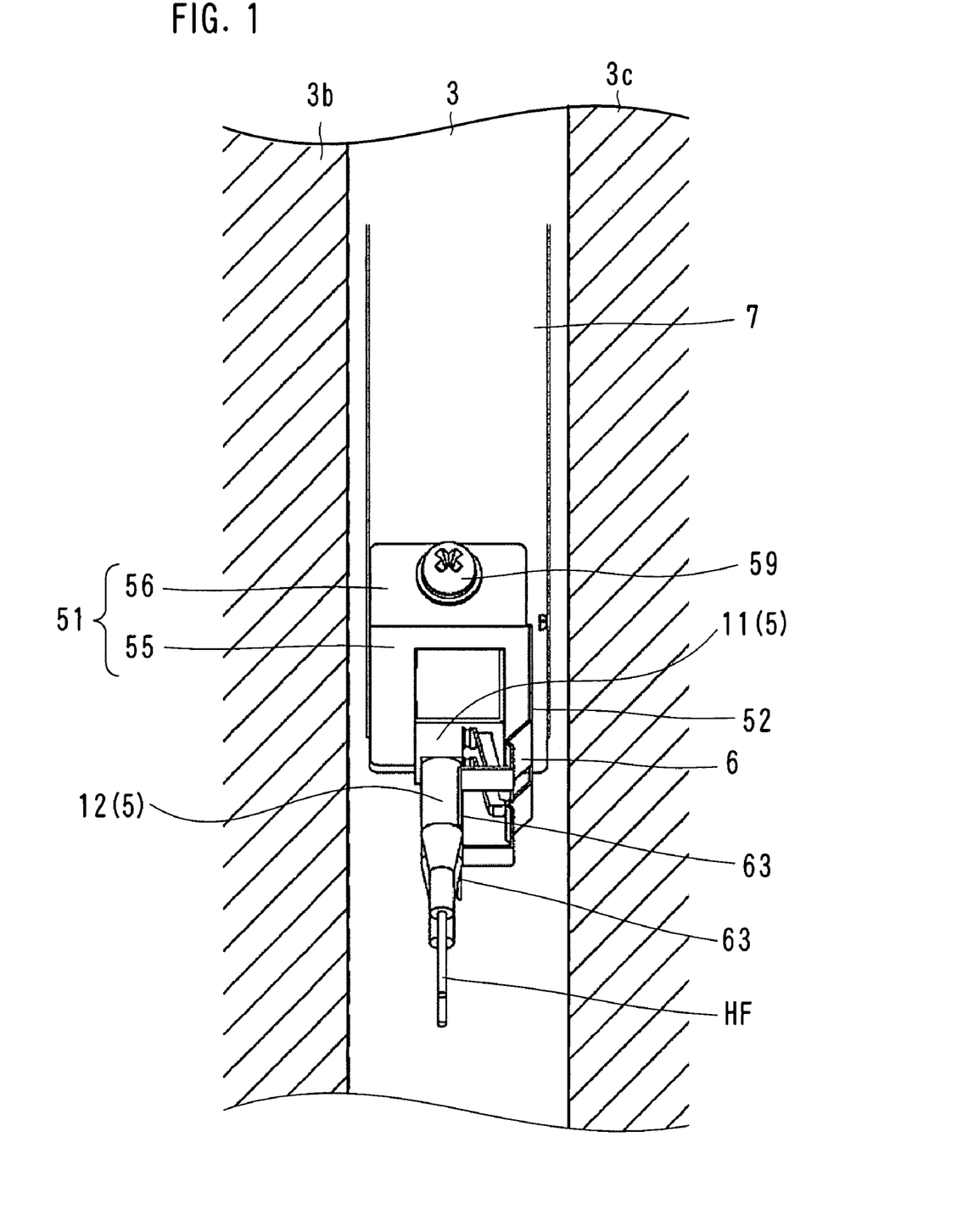
FIG. 1 is a front view of a printed circuit board on which an optical connector according to the present invention is mounted.
Figure 2:
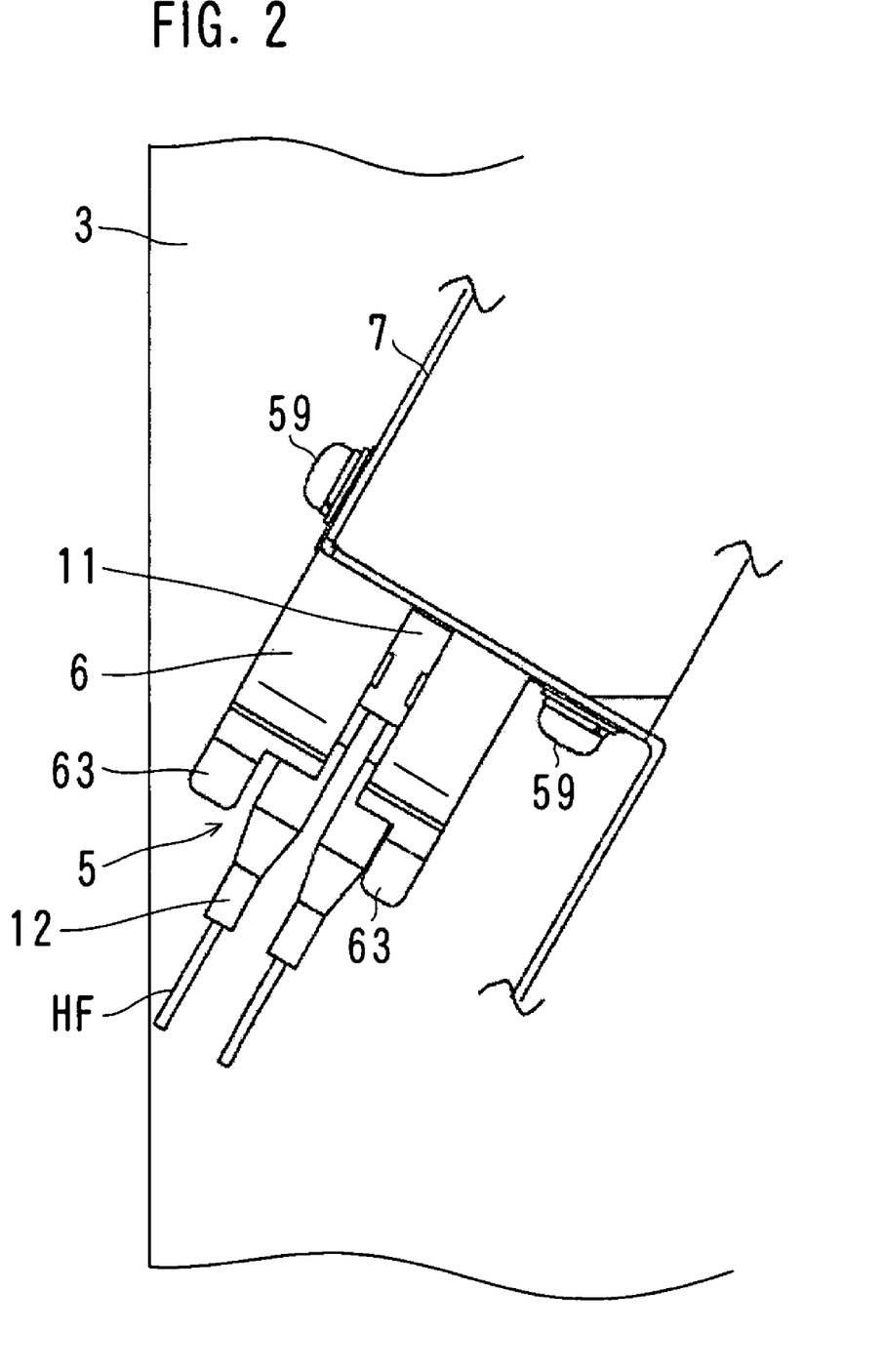
FIG. 2 is a right side view of a printed circuit board.
Figure 3:
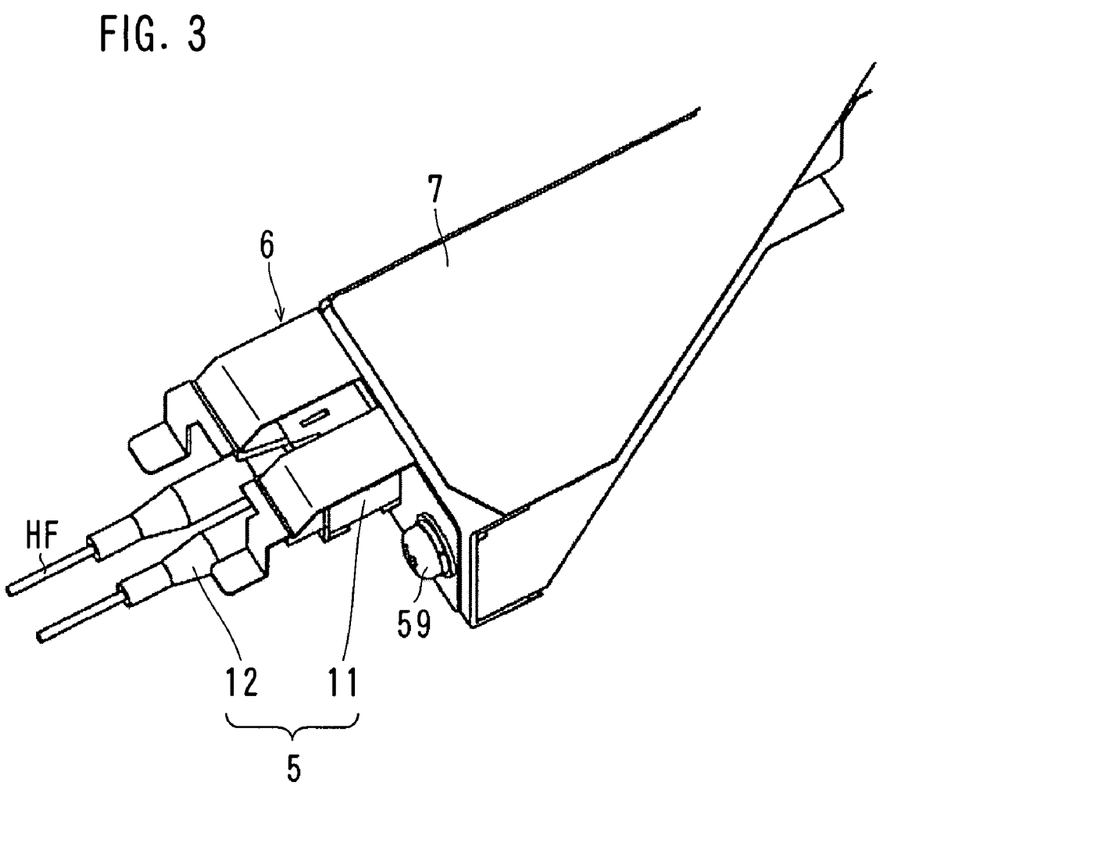
FIG. 3 is a perspective view of the optical connector shown in FIG. 2.
Figure 4:
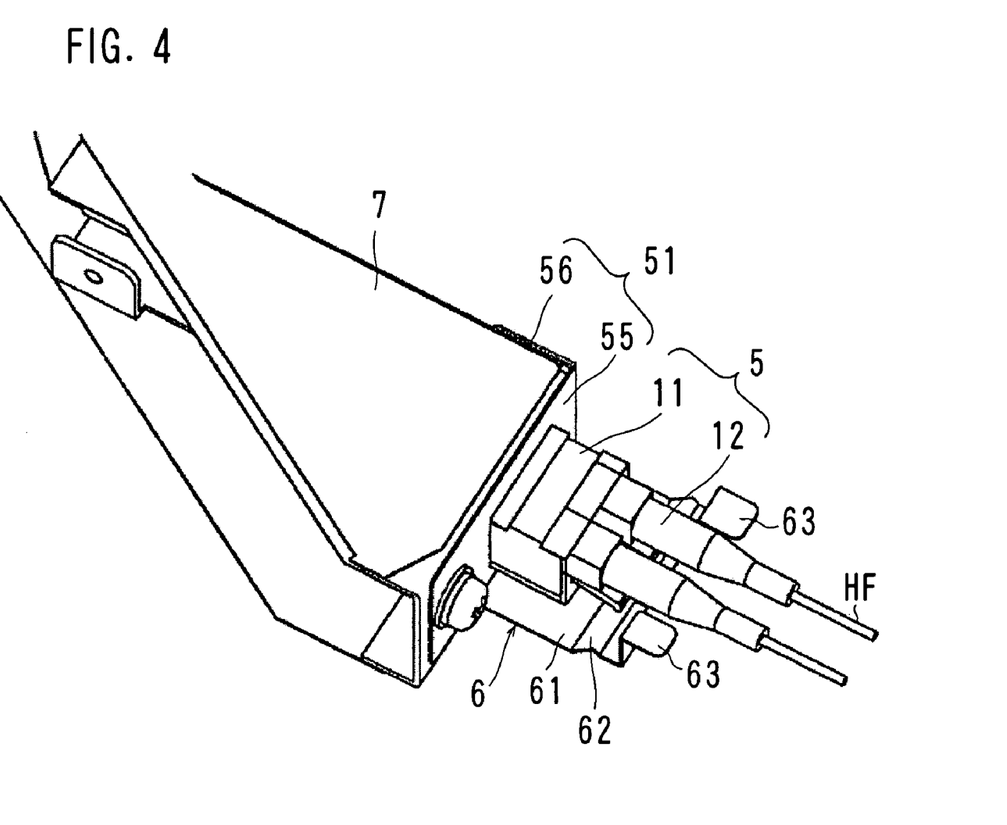
FIG. 4 is a perspective view of the optical connector shown in FIG. 2.
Figure 5A:
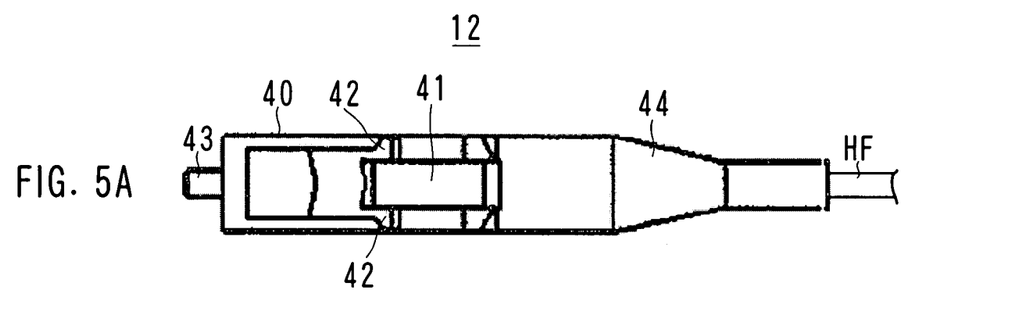
FIG. 5A is a top view of a plug constituting an optical connector and FIG. 5B is a front view of the same.
Figure 5B:
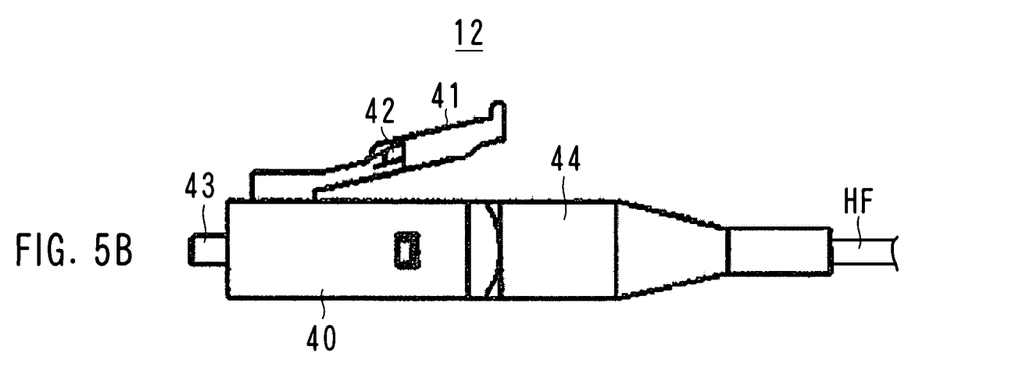
Figure 6:
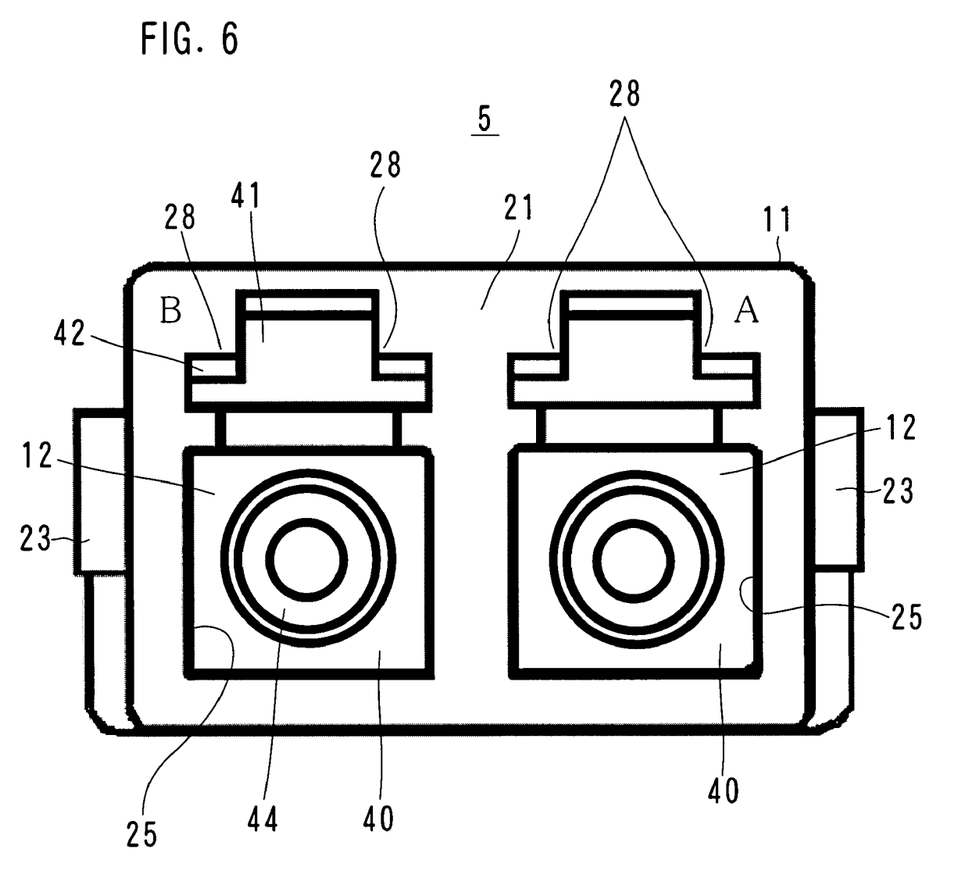
FIG. 6 is a right side view of an optical connector.
Figure 7:
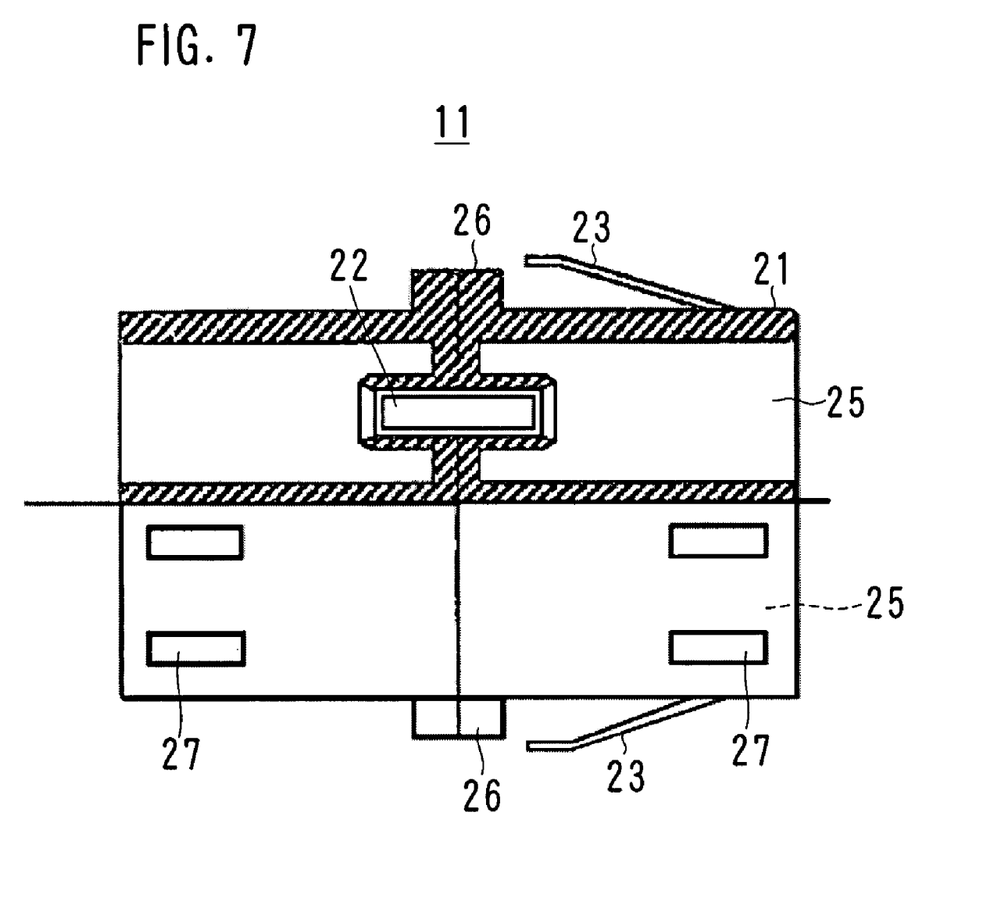
FIG. 7 is a top sectional view of an optical connector.
Figure 8:
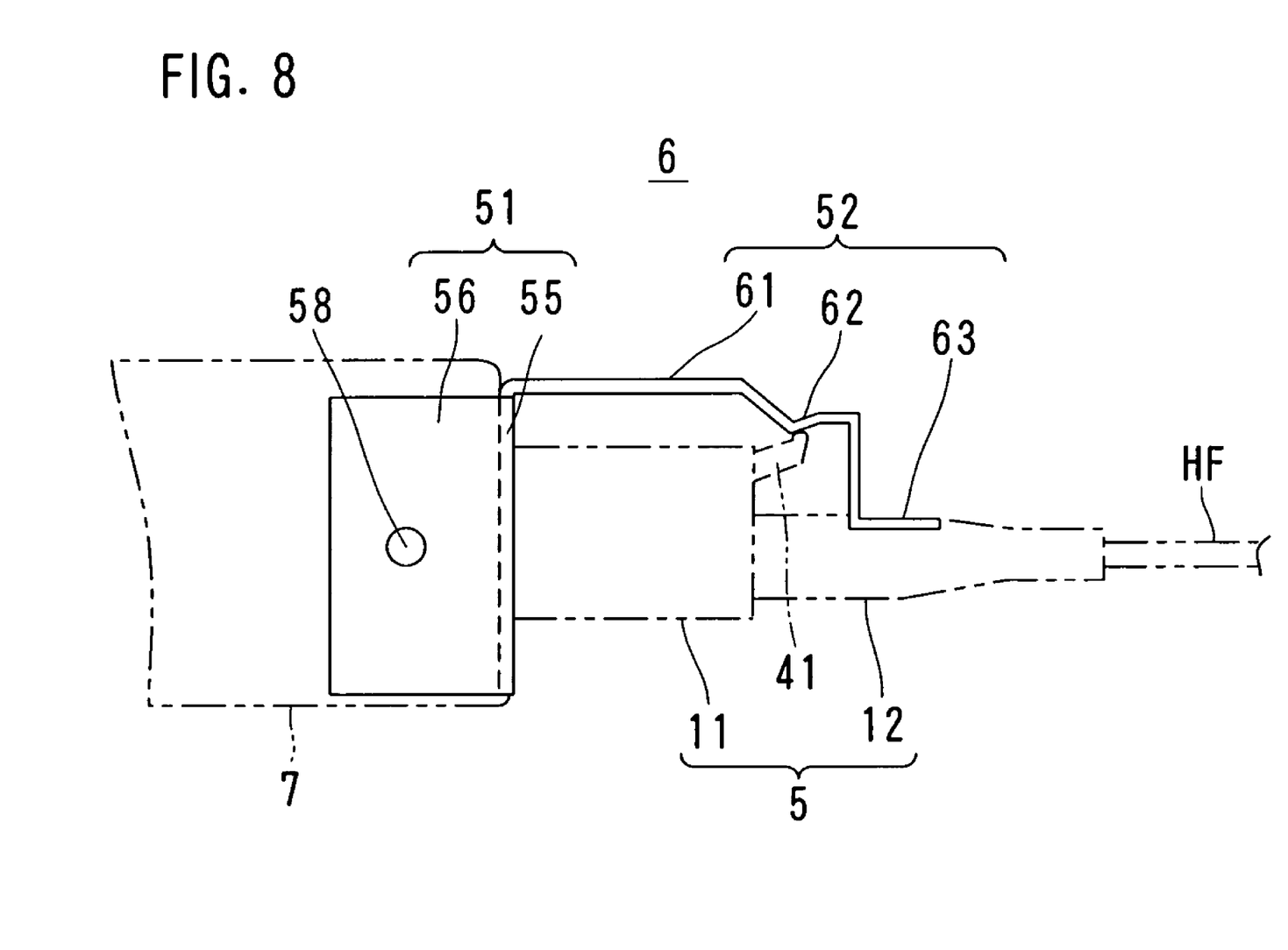
FIG. 8 is a front view of a release auxiliary device.
Figure 9:
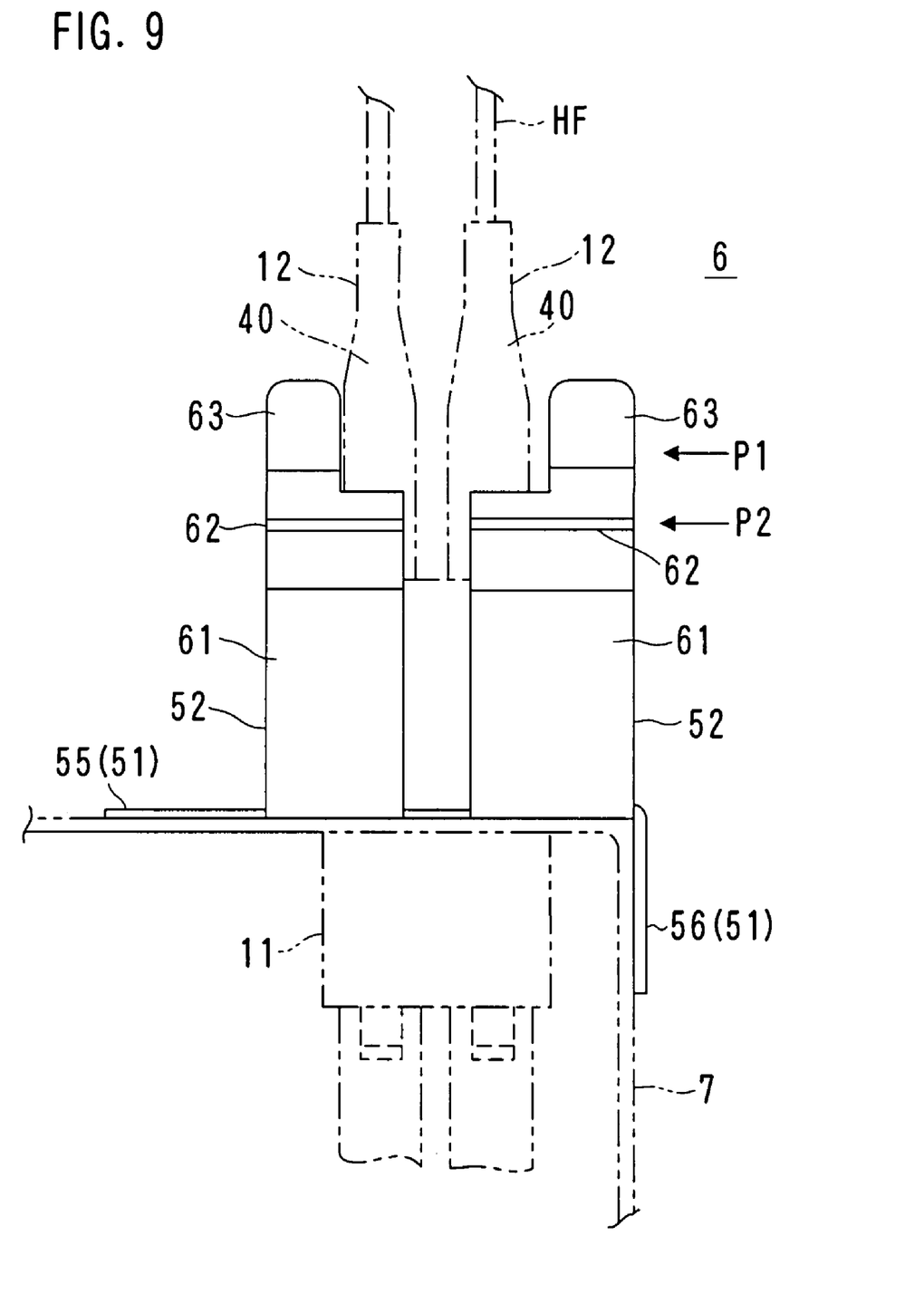
FIG. 9 is a plan view of a release auxiliary device.
Figure 10:
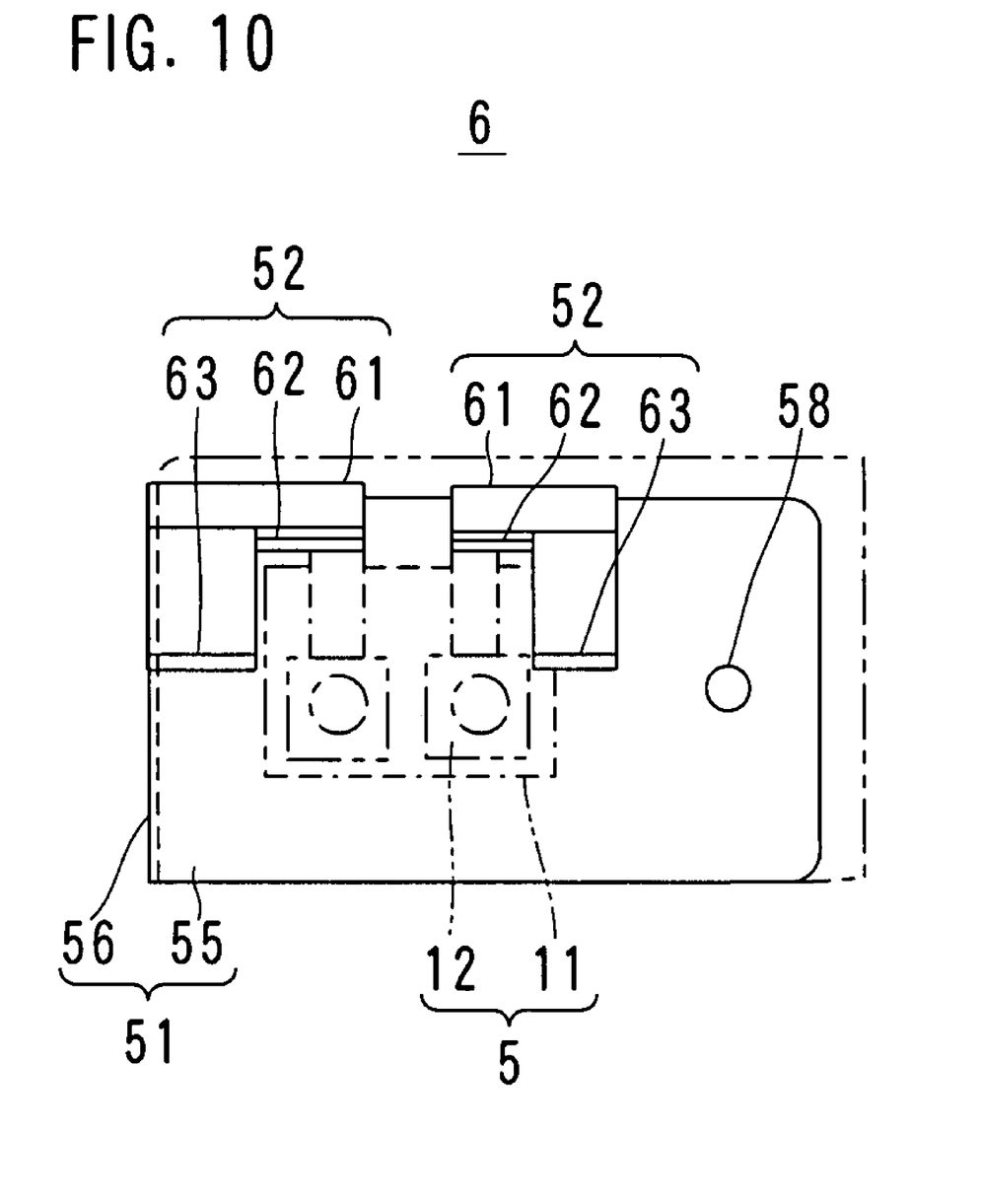
FIG. 10 is a right side view of a release auxiliary device.
Figure 11:
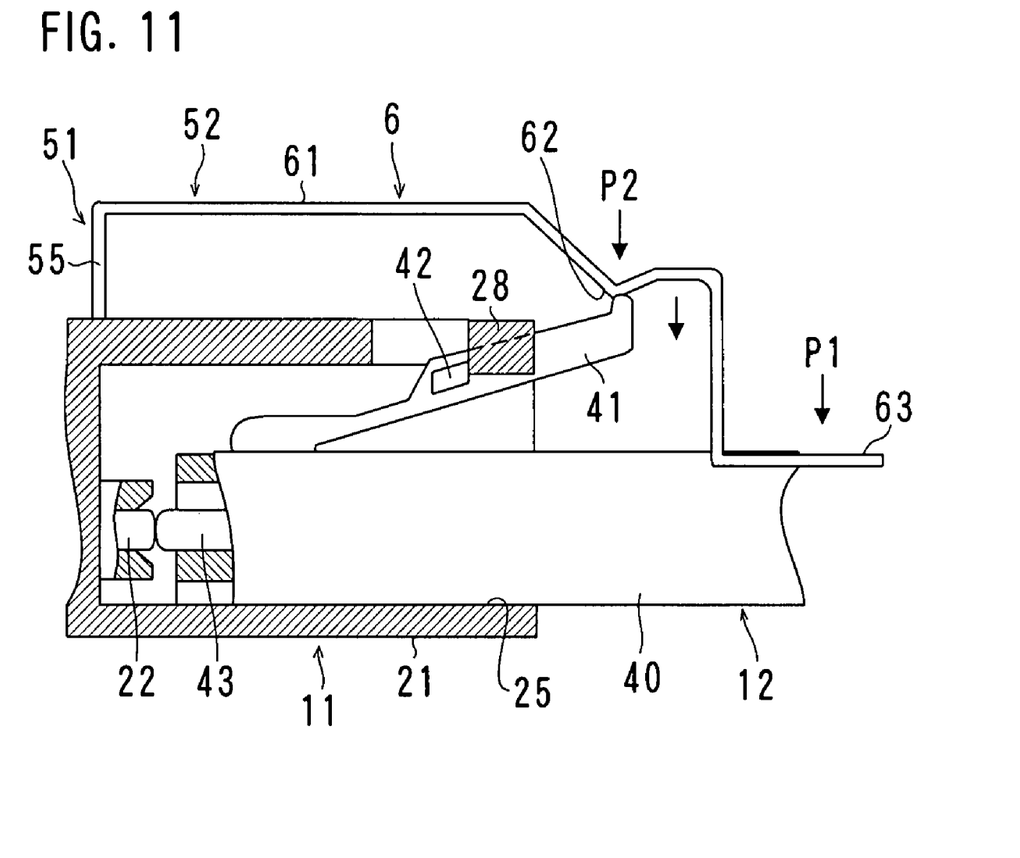
FIG. 11 is a cross sectional view showing the main part of an optical connector to which a release auxiliary device is attached.

FIG. 1 is a front view of a printed circuit board 3 on which an optical connector 5 according to the present invention is mounted, FIG. 2 is a right side view of the printed circuit board 3, FIG. 3 is a perspective view when the optical connector 5 shown in FIG. 2 is viewed from the lower right on the front surface side of the printed circuit board 3 shown in FIG. 2, FIG. 4 is a perspective view when the optical connector 5 shown in FIG. 2 is viewed from the lower right on the rear surface side of the printed circuit board 3 shown in FIG. 2, FIG. 5A is a top view of a plug 12 constituting the optical connector 5 and FIG. 5B is a front view of the same, FIG. 6 is a right side view of the optical connector 5, FIG. 7 is a top sectional view of the optical connector 5, FIG. 8 is a front view of a release auxiliary device 6, FIG. 9 is a plan view of the release auxiliary device 6, FIG. 10 is a right side view of the release auxiliary device 6, and FIG. 11 is a cross sectional view showing the main part of the optical connector 5 to which the release auxiliary device 6 is attached.

Referring to FIGS. 1-4, a plurality of printed circuit boards 3, 3b and 3c are mounted within a rack shelf of a communication device. The printed circuit boards 3, 3b and 3c are densely disposed in parallel to one another. A front plate 7 that is made of a thin metal plate and formed in a step-like shape is attached to the printed circuit board 3. The optical connector 5 and the release auxiliary device 6 are attached to the front plate 7.

The optical connector 5 shown in this embodiment is a duplex optical connector in which two receptacles are formed to be integral with each other and a plug coupled to optical fibers is inserted into each of the receptacles. Since the receptacles have the same structure and the plugs have the same structure, a description is given here of one of the receptacles and one of the plugs.

As described above, the optical connector 5 includes the plug 12 to which the optical fibers HF are coupled and the receptacle 11 into which the plug 12 is inserted. The optical connector 5 itself is a well-known LC type optical connector. Accordingly, since the shape, the structure, the operation method of each of the receptacle 11 and the plug 12 themselves are known, only a brief description is given here.

As clearly shown in FIG. 2, the plug 12 of the optical connector 5 is inserted into the receptacle 11 from the lower left toward the upper right on the front surface side in FIG. 2 and is connected to the receptacle 11, and thereby the optical connector 5 is attached in a manner to project from the front plate 7. In order to detach the plug 12 from the receptacle 11, the plug 12 should be pulled downward in FIG. 2 while operating the release auxiliary device 6 with fingers.

Referring further to FIGS. 6 and 7, the receptacle 11 includes a housing 21 that is made of synthetic resin and has a rectangular parallelepiped shape, a split sleeve 22 that is made of zirconia or the like and provided in the middle of the inside of the receptacle 11 and a plate 23 that is made of a spring material. The housing 21 is provided with two holes 25. The plugs 12 are inserted from openings provided on both sides of the respective holes 25. An LC ferrule 43 that is provided in an end portion of each of the two plugs 12 inserted from the both sides into the same hole 25 touches to (abuts against) an end surface of the split sleeve 22 and is optically coupled to the optical fibers HF.

In order to attach the receptacle 11 to the front plate 7, a side of the receptacle 11 in which the plate 23 is provided is inserted from the rear side of the front plate 7 into a rectangular hole provided on the front plate 7. An edge of the plate 23 and a collar 26 provided in the housing 21 sandwich the front plate 7 at a position where the plate 23 penetrates to the front side of the front plate 7. Thereby, the receptacle 11 is fixed to the front plate 7. A part of the wall surfaces of the housing 21 is provided with slit windows 27 leading to the holes 25.

The housing 21 has an inner surface that has a shape adapted to hold the plug 12 when the plug 12 is inserted. For example, the hole 25 of the housing 21 has a shape substantially the same as the cross-sectional shape of a body 40 of the plug 12. Further, projections 28 are formed which have a function of engaging with engaging convex portions 42 provided on both sides of a lever 41 of the plug 12 and of retaining the engaging convex portions 42 (see FIG. 11).

Referring to FIGS. 5A and 5B, the body 40 of the plug 12 is made of synthetic resin and is like a prism having a substantially square cross section. The lever 41 described above is formed to be integral with the body 40 on a side surface thereof on the front side. The lever 41 has elasticity and is capable of being deformed elastically to be close to the body 40 of the plug 12 by operating the end portion of the lever 41 with fingers. The engaging convex portions 42 are provided on both end surfaces in almost the center of the lever 41 to project from the lever 41 on both sides as shown in FIG. 5A. An end portion of the body 40 is provided with the LC ferrule 43 that is made of zirconia or the like and has a cylinder-like shape. The LC ferrule 43 is optically coupled, inside the body 40, to the optical fibers HF inserted from the rear end of the body 40. The rear end portion of the body 40 is covered with a tube 44 that serves to protect an extending part of the optical fibers HF.

Referring to FIG. 11 again, in order to insert the plug 12 into the receptacle 11, the plug 12 is inserted into the hole 25 of the receptacle 11 as it is. Thereby, the lever 41 is pushed by the wall surface of the receptacle 11 and deforms elastically, and the engaging convex portions 42 engage with the projections 28, so that the plug 12 is retained. In order to detach the plug 12 from the receptacle 11, the lever 41 is caused to be deformed against the elastic force thereof by holding the end of the lever 41 with fingers. Thereby, the engagement between the engaging convex portions 42 and the projections 28 is released, and under this condition the plug 12 is detached from the receptacle 11.

Next, referring to FIGS. 8-10, the release auxiliary device 6 includes a base member 51 and an auxiliary lever 52 that are made of synthetic resin and are formed to be integral with each other. The base member 51 is fixedly provided with respect to the receptacle 11 while the auxiliary lever 52 is provided in an elastically deformable manner with respect to the base member 51.

The base member 51 includes a flat plate part 55 that has a rectangular shape and has a rectangular hole through which the receptacle 11 passes and a vertical plate part 56 that extends from one edge of the flat plate part 55 in the vertical direction. The flat plate part 55 and the vertical plate part have a hole 58. A screw 59 is inserted into the hole 58 and is screwed in a screw hole provided in the front plate 7, so that the release auxiliary device 6 is fastened to the front plate 7. Thereby, the release auxiliary device 6 is fixedly provided with respect to the receptacle 11.

The auxiliary lever 52 includes a base part 61 extending to the base member 51, a pressing part 62 that extends to the base part 61 and is touchable to the end portion of the lever 41 and an operating part 63 that extends to the pressing part 62 and is disposed at a position closer to the body 40 of the plug 12 than the end portion of the lever 41 is. All of the base part 61, the pressing part 62 and the operating part 63 are formed to have a thin plate shape.

More specifically, as clearly shown in FIG. 9, the base part 61 and the pressing part 62 have a large width while the operating part 63 has a small width. Such a structure prevents the interference with the plug 12 in the case where the operating part 63 is operated.

Referring to FIG. 11, at a position P1, when the operating part 63 is operated by pressing the same with fingers, the base part 61 deflects, and at a position P2, the pressing part 62 presses against the end portion of the lever 41 and the lever 41 is moved in the direction shown by the arrow. Thereby, the engagement between the engaging convex portions 42 of the lever 41 and the projections 28 of the receptacle 11 is released, so that the plug 12 can be easily detached from the receptacle 11. Note that the pressing part 62 is not in contact with the lever 41 in the free state, and the pressing part 62 comes into contact with the lever 41 when the operating part 63 is operated.

The following is a further detailed description of the release auxiliary device 6.

The operating part 63 is disposed on a side surface side of the body 40 of the plug 12, i.e., on a side surface side with respect to a surface on which the lever 41 of the plug 12 is provided. This structure enables a user to operate the operating part 63 with fingers on the side surface side of the body 40 of the plug 12. Further, even in the case where the optical connector 5 is attached in a small space, a space necessary for operating the operating part 63 is secured. Furthermore, interference due to the touch of fingers on the plug 12 does not occur and a user can release the engagement of the lever 41 with easy operation.

The operating part 63 has a plane-like shape extending along the axis direction of the plug 12. The operating part 63 and the pressing part 62 are connected to each other via a plane and they form a substantially Z-shape as viewed from the lateral side. In this embodiment, the pressing part 62 forms a V-shape as viewed from the lateral side. Instead, however, the pressing part 62 may have a plane-like shape parallel to the operating part 63.

As described earlier, since the receptacle 11 according to this embodiment is duplex, the two plugs 12 can be inserted into the receptacles 11 side by side. As clearly shown in FIG. 9, in the release auxiliary device 6, the base member 51 is provided with the two auxiliary levers 52, and the operating parts 63 of the two auxiliary levers 52 are arranged on side surfaces opposite to the bodies 40 of the plugs 12 respectively. Such a structure enables separate operation of the levers 41 of the two plugs 12.

The release auxiliary device 6 may be provided with three or more of the auxiliary levers 52 in accordance with the number of series of the receptacles 11. Alternatively, the release auxiliary device 6 may be provided with, for example, a single lever 41 regardless of the number of series of the receptacles 11. In such a case, the release auxiliary device 6 may be elastically engaged with the receptacle 11 and be fixed thereto by covering the receptacle 11 with the release auxiliary device 6, instead of fastening the release auxiliary device 6 to the front plate 7 with a screw.

An operation example is as follows. Referring to FIG. 1, for example, fingers are inserted between the printed circuit board 3c and the operating part 63, and the operating part 63 is moved, with fingers, to the left in the drawing. This operation releases the engagement of the lever 41, so that the plug 12 can be easily detached from the receptacle 11. The operating part 63 is disposed on the side surface side of the body 40 of the plug 12. Accordingly, a space for inserting fingers for operation of the operating part 63 is secured.

In the embodiments described above, the base member 51 is fastened to the front plate 7 with two screws. Instead, however, another structure is possible in which the base member 51 is fastened to the front plate 7 with a screw at one position and is caused to be engaged with the front plate 7 with a projection or the like at another position. The release auxiliary device 6 described above is produced by molding using synthetic resin. However, it may be produced by a different method, e.g., by sheet metal working of a metal sheet.

In the release auxiliary device 6 described above, the overall structure of the base part 61, the pressing part 62, the operating part 63, the auxiliary lever 52, the base member 51 and the release auxiliary device 6, the structures of various portions thereof, the shape, the size, the number, and the materials thereof, and the like may be changed as needed, in accordance with the subject matter of the present invention. Further, the release auxiliary device 6 can be applied to optical connectors having various shapes and structures as the optical connector 5.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A retention release auxiliary device for an optical connector, the optical connector including a plug to which optical fibers are coupled and a receptacle into which the plug is inserted, wherein the plug is provided with a lever on a front side of a body of the plug, the lever being elastically deformable to approach the body of the plug by operating an end portion of the lever with fingers, an engaging portion formed in the lever engages with an engaging portion provided in the receptacle, leading to retention of the engaging portion of the lever and the engaging portion of the receptacle, the lever is caused to be deformed against an elastic force thereof by operating the end portion of the lever with fingers, so that the engagement between the engaging portions is released, enabling detachment of the plug from the receptacle, the retention release auxiliary device comprises a base member that is fixedly provided with respect to the receptacle, and an auxiliary lever that is provided in an elastically deformable manner with respect to the base member, the auxiliary lever includes a base part extending to the base member, a pressing part that extends to the base part and is touchable to the end portion of the lever, and an operating part that extends to the pressing part and is disposed at a position closer to the body of the plug than the end portion of the lever is, and the pressing part presses against the end portion of the lever, moves the lever by operating the operating part with fingers, enabling release of the engagement between the engaging portions.

2. The device according to claim 1, wherein the operating part is disposed on a side surface side of the body of the plug and is operable with fingers on the side surface side of the body of the plug.

3. The device according to claim 2, wherein the operating part has a plane-like shape extending along an axis direction of the plug, and the operating part and the pressing part are connected to each other via a plane and form a substantially Z-shape as viewed from a lateral side.

4. The device according to claim 1, wherein the receptacle is configured to receive at least two plugs side by side therein, and the base member is provided with two of the auxiliary levers, and the operating parts of the two auxiliary levers are disposed on side surface sides opposite to the bodies of the plugs respectively, enabling separate operation of the two plugs.

5. A printed circuit board device comprising:

an optical connector that is mounted on a front side of a printed circuit board; and the retention release auxiliary device for an optical connector according to any of claims 1-4 that is attached to the optical connector.

* * * * *